(12) United States Patent
Grace

(10) Patent No.: US 7,711,269 B2
(45) Date of Patent: *May 4, 2010

(54) IRDA TRANSCEIVER MODULE THAT ALSO FUNCTIONS AS REMOTE CONTROL IR TRANSMITTER

(75) Inventor: Alan Grace, San Bruno, CA (US)

(73) Assignee: ZiLOG, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/383,510

(22) Filed: Mar. 24, 2009

(65) Prior Publication Data

US 2009/0185809 A1    Jul. 23, 2009

Related U.S. Application Data

(63) Continuation of application No. 10/788,180, filed on Feb. 25, 2004, now Pat. No. 7,509,057.

(51) Int. Cl.
*H04B 10/08* (2006.01)
(52) U.S. Cl. ........................... 398/106; 398/201
(58) Field of Classification Search ............... 398/106, 398/189, 201
See application file for complete search history.

(56) References Cited

U.S. PATENT DOCUMENTS

| | | | | |
|---|---|---|---|---|
| 4,495,494 A | | 1/1985 | McCune | 398/111 |
| 4,553,267 A | | 11/1985 | Crimmins | 455/606 |
| 4,575,742 A | * | 3/1986 | Kohashi et al. | 148/33.4 |
| 4,725,788 A | | 2/1988 | Lodahl | 330/10 |
| 4,745,368 A | | 5/1988 | Lodahl | 330/10 |

(Continued)

FOREIGN PATENT DOCUMENTS

EP    1054423 A1    5/1999

(Continued)

OTHER PUBLICATIONS

"Interfacing the Agilent HSDL-3002 for Remote Control Operation," Application Note 1314 by Agilent Technologies, Inc., Feb. 18 2003, 16 pages. (ISBN: 5988-7936EN).

(Continued)

*Primary Examiner*—Leslie Pascal
(74) *Attorney, Agent, or Firm*—Imperium Patent Works; T. Lester Wallace; Darien K. Wallace

(57) ABSTRACT

The infrared LED of an IrDA module transmits IR energy with a peak wavelength (for example, 875 nm) appropriate for IrDA communication. This peak wavelength is lower than is the wavelength (for example, 940 nm) used in ordinary IR remote controls (RC). The IrDA LED does, however, transmit some energy at the wavelength of the peak sensitivity of an RC receiver. When making an IrDA transmission, the IrDA LED is driven with a lower amount of current. When making an RC transmission, the IrDA LED is driven with an increased amount of current such that higher wavelength emissions received by the RC receiver are of adequate power to realize RC communication. A passive circuit is disclosed for automatically increasing IrDA LED current during RC transmissions. The circuit involves an inductor that shunts current around a current-limiting resistor used to limit LED drive current.

18 Claims, 5 Drawing Sheets

U.S. PATENT DOCUMENTS

| | | | |
|---|---|---|---|
| 4,912,620 A | 3/1990 | O'Dell | 363/20 |
| 5,652,561 A | 7/1997 | Inoh et al. | 336/200 |
| 5,850,189 A | 12/1998 | Sakanaka et al. | 340/825.72 |
| 5,933,265 A | 8/1999 | Nagarajan | 398/208 |
| 5,936,599 A | 8/1999 | Reymond | 345/82 |
| 6,198,405 B1 | 3/2001 | Andersson et al. | 340/815.45 |
| 6,208,534 B1 | 3/2001 | Shteynberg et al. | 363/21 |
| 6,407,779 B1 | 6/2002 | Herz | 348/734 |
| 6,471,716 B1 | 10/2002 | Pecukonis | 607/89 |
| 6,563,926 B1 | 5/2003 | Pistilli | 379/412 |
| 6,606,174 B1 | 8/2003 | Ishikawa et al. | 359/152 |
| 6,664,875 B2 | 12/2003 | Yuan et al. | 335/216 |
| 7,474,857 B2 * | 1/2009 | Grace | 398/182 |
| 7,509,057 B2 * | 3/2009 | Grace | 398/201 |
| 2002/0018327 A1 | 2/2002 | Walker et al. | 361/58 |
| 2003/0103088 A1 | 6/2003 | Dresti et al. | 345/835 |
| 2003/0156842 A1 | 8/2003 | Morimoto et al. | 398/107 |
| 2004/0086840 A1 | 5/2004 | Redford et al. | 434/307 |
| 2004/0135562 A1 | 7/2004 | Oden | 323/282 |
| 2004/0190291 A1 | 9/2004 | Chliwnyj | 362/240 |
| 2004/0213576 A1 | 10/2004 | Tan et al. | 398/140 |
| 2005/0062556 A1 | 3/2005 | Aronson | 333/33 |
| 2005/0077623 A1 | 4/2005 | Roberts et al. | 257/724 |
| 2006/0161865 A1 | 7/2006 | Scott et al. | 715/810 |
| 2008/0310850 A1 * | 12/2008 | Pederson et al. | 398/135 |

FOREIGN PATENT DOCUMENTS

| | | |
|---|---|---|
| EP | 1345341 A2 | 11/2002 |
| JP | 60178735 | 2/1984 |
| JP | 01238177 | 3/1988 |

OTHER PUBLICATIONS

"Agilent IrDA Data Link Design Guide," by Agilent Technologies, Inc., Mar. 26, 2003, 67 pages. (Doc. No. 5988-9321EN).

"Agilent HSDL-3003 IrDA Data Compliant Low Power 115.2 kbit/s with Remote Control Infrared Transceiver," Data Sheet by Agilent Technologies, Inc., Jun. 11, 2003, 21 pages. (Doc. No. 5988-9510EN).

"Utilizing a Vishay IrDA Transceiver for Remote Control," Application Note by Vishay Semiconductors, Feb. 20 2004, 14 pages. (Doc. No. 82606).

Webpage entitled "Infrared transceivers—Vishay—Remote control applications" downloaded on Feb. 24, 2004 from www.vishay.com/ir-transceivers/remote-list/, 5 pages.

Lenk, John D., "Simplified Design of Switching Power Supplies" pp. 46-47 Mar. 1, 1996.

* cited by examiner

IRDA TRANSCEIVER MODULE THAT ALSO FUNCTIONS AS REMOTE CONTROL IR TRANSMITTER

CROSS REFERENCE TO RELATED APPLICATION

This application is a continuation of, and claims priority under 35 U.S.C. §120 from, nonprovisional U.S. patent application Ser. No. 10/788,180 entitled "IrDA Transceiver Module That Also Functions As Remote Control IR Transmitter," filed on Feb. 25, 2004, now U.S. Pat. No. 7,509,057, the subject matter of which is incorporated herein by reference.

TECHNICAL FIELD

The present invention relates generally to IrDA transceivers.

BACKGROUND INFORMATION

Personal digital assistants (PDAs), cell phones, digital cameras, laptop computers and other portable electronic devices often use a type of infrared transceiver called an IrDA (Infrared Data Association) transceiver to transfer information. FIG. 1 illustrates a typical IrDA transceiver 1. Transceiver 1 is a multi-chip module that is enclosed in a metal shield 2. FIG. 2 is a cross-sectional view of the IrDA transceiver. FIG. 3 is a top-down cross-sectional view of the circuitry within the IrDA module. The IrDA module includes three dice: 1) an IR transmitter diode die 3, 2) an IR receiver PIN diode die 4, and 3) a controller die 5. The three dice are mounted on a very small circuit board 6. Molded plastic 7 covers the printed circuit board and die assembly and forms two semi-spherical lenses 8 and 9. Lens 8 is to focus incoming IR radiation 10 onto the PIN receiver diode 4. Lens 9 is to redirect the radiation from the IR transmitter diode die 3 into a beam 11.

Electronic consumer devices in the home such as televisions, VCRs, DVD players, stereo equipment, home theatre equipment, CD players and so forth are typically controlled by remote control devices that transmit IR signals. Although the various manufacturers of electronic consumer devices use different coding and modulation schemes to control their electronic consumer devices, the overall use of IR to control such electronic consumer devices is referred to here as "RC".

Although both IrDA and RC both use IR to communicate, the two use different wavelengths of IR. IrDA typically uses an infrared signal in the range of 850 nm to 900 nm (for example, 875 nm). RC remote control devices typically use an infrared signal of 900 nm to 950 nm (for example, 940 nm). In addition to the IR wavelength, IrDA and RC use very different protocols. For this reason, IrDA and RC have been considered two different communication schemes.

It has been recognized, however, that the IrDA transceivers so common in PDAs, cell phones, digital cameras, and laptop computers all include IR transmitter diodes. It would be advantageous if these IrDA IR transmitters could be used to control electronic consumer devices in the home. One PDA manufacturer has endeavored to have the IrDA module in its PDAs be capable of controlling electronic consumer devices in the home. PDAs are currently on the market with this functionality.

FIGS. 1-4 illustrate the design employed by this PDA manufacturer. For additional information, see: 1) "Agilent HSDL-3003 IrDA Data Compliant Low Power 115.2 kbit/s with Remote Control Infrared Transceiver—Data Sheet," 21 pages, June 2003, 2) "Interfacing the Agilent HSDL-3002 for Remote Control Operation—Application Note 1314," 16 pages, February 2003, and 3) "Agilent IrDA Data Link Design Guide," 67 pages, March 2003.

Because RC electronic consumer devices typically respond to IR signals at 940 nm, an 940 nm RC transmitter diode 12 is included along with the 875 nm IrDA transmitter diode 3. When an IRDA transmission is to be made, then the IrDA driver portion of controller die 5 pulls current through the 875 nm IrDA transmitter diode 3 in standard IrDA fashion. When an RC transmission is to be made, then an external FET 13 is made conductive to pull current through the added 940 nm RC transmitter diode 12.

In order to be able to provide the coding information needed to control all the many electronic consumer devices on the market, the PDA manufacturer has consulted a manufacturer of IR remote controls. The remote control manufacturer evidently will not provide the PDA manufacturer the coding information independently of hardware. The remote control manufacturer is evidently requiring the PDA manufacturer to buy microcontrollers from the remote control manufacturer that have the coding information programmed into them. The PDA manufacturer is therefore forced to provide a microcontroller 14 (that includes the coding information) in each PDA it manufacturers.

Although it might seem that the functionality of FET 13 could be included on controller die 5, the PDA manufacturer has evidently chosen not to do this. The reason may be that FET 13, in order to pull the required amount of current through the 940 nm diode, has to have a low on-resistance. Realizing a FET with such a low on-resistance would take up so much integrated circuit area that controller die 5 would be so large that it could not any longer fit into the confining space of the standard IrDA form factor. Providing the two transmitter diodes into the form factor is difficult even without increasing the die size of controller die 5. Accordingly, the design employed on the PDAs involves at least three components external to the IrDA module: 1) the FET 13, 2) the microcontroller 14, and 3) a current-limiting resistor 15. FIG. 1 illustrates the external FET component 13 as well as external resistor 15. External microcontroller 14 is not pictured.

Not only does the PDA design set forth above involve an external microcontroller, a FET and a resistor, but the design also requires an extra IR transmitter LED 12 to be provided in the IrDA module. Providing this IR LED die adds cost to the system. In addition, IrDA module assembly can be more expensive because the placement of the two IR LEDs is somewhat difficult. The two IR LED diode dice need to be placed close to one another in order to be satisfactorily aligned with respect to the optics of lens 9. Very importantly, the PDA manufacturer is forced to buy and power a microcontroller just to get the coding information needed to interface to RC electronic consumer devices.

It has been recognized that an 886 nm IrDA transmitter LED within an IrDA module can be used as a transmitter both for IrDA and RC applications. Although the peak wavelength of the 886 nm IrDA transmitter LED and the wavelength of peak sensitivity of a remote control receiver are not matched, radiation transmitted by the 886 nm transmitter LED is nonetheless received at the remote control receiver. Due to the mismatch, however, it may be necessary for the IrDA transmitter LED power to be increased in order for it to work properly in a remote control application. A recent application note from Vishay Semiconductors (Vishay Semiconductor Application Note entitled "Utilizing a Vishay IrDA Transceiver for Remote Control", document number 82606, 14 pages, Feb. 20, 2004) discloses reducing the value of a current-limiting resistor so as to increase IrDA LED peak current and thereby to increase emission intensity of the IrDA LED transmitter. Laboratory test results are described, but a workable and cost-effective mechanism or circuit for reducing the value of the current-limiting resistor is not set forth.

SUMMARY

Rather than providing a first infrared LED that has a peak emission suited for IrDA communication and a second infrared LED that has a peak emission suited for remote control (RC) communication, a single IrDA LED having a peak emission suited for IrDA communication (for example, 875 nm) is used to transmit both an IrDA transmission as well as an RC transmission. By using a single infrared LED for both IrDA and RC transmission purposes, the field effect transistor (FET) of the prior art solution of FIG. 4 is omitted. RC codeset information is made available to the central processing unit (CPU) of the device of which the IrDA module is a part, thereby allowing the CPU to generate RC signals. This eliminates the need for the separate microcontroller of the prior art solution of FIG. 4 and further reduces overall system cost, size and power consumption.

In an IrDA mode, the IrDA 875 nm LED is driven with a lower amount of average LED drive current. This amount of average LED drive current is, in some embodiments, determined at least in part by the resistance of a current-limiting resistor that is disposed in the path of the LED drive current.

In an RC mode, the IrDA 875 nm LED is driven with an increased amount of current such that higher wavelength emissions received by an RC receiver (for example, an RC receiver on a television or other electronic consumer device) will be of adequate power to realize RC communication at a distance of ten meters. A passive circuit is disclosed for automatically increasing average IrDA LED drive current when an RC transmission is being transmitted from the IrDA LED. In one embodiment, the passive circuit involves an inductor that shunts current around the current-limiting resistor, thereby increasing IrDA LED drive current. In one embodiment, current flow through the inductor saturates in the RC mode, thereby fixing the maximum average LED drive current with which the IrDA 875 nm LED is driven in the RC mode.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
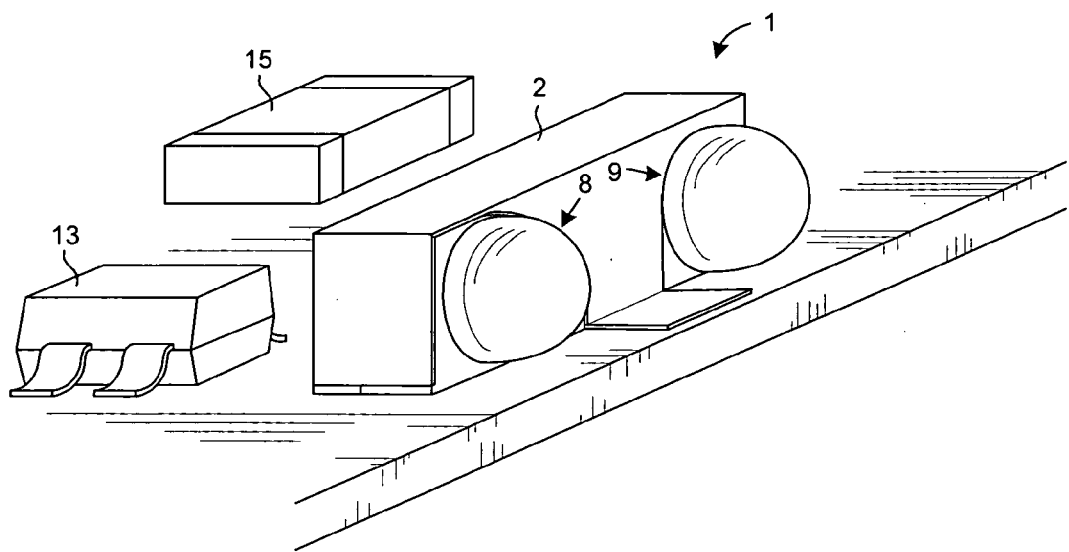
FIG. 1 (Prior Art) is a perspective view of a conventional IrDA module.
Figure 2:
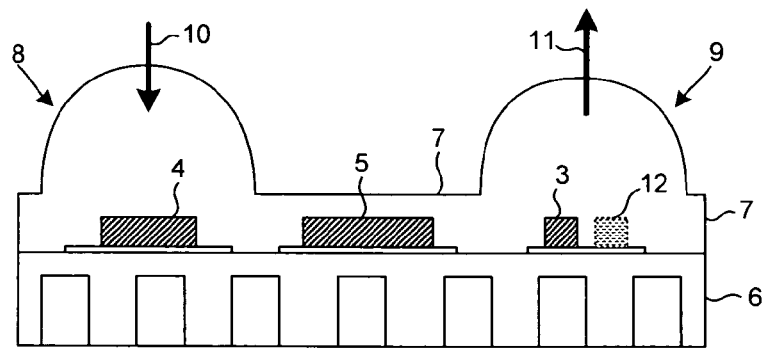
FIG. 2 (Prior Art) is a cross-sectional side view of the IrDA module of FIG. 1.
Figure 3:
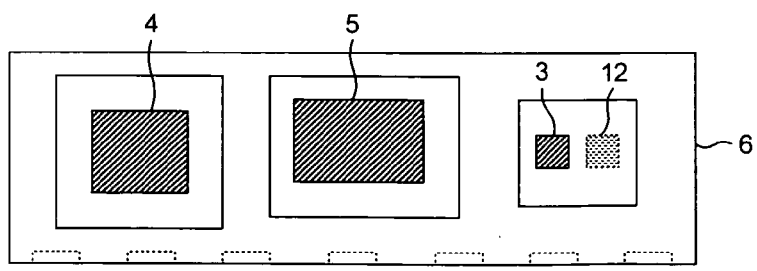
FIG. 3 (Prior Art) is a cross-sectional top-down view of the IrDA module of FIG. 1.
Figure 4:
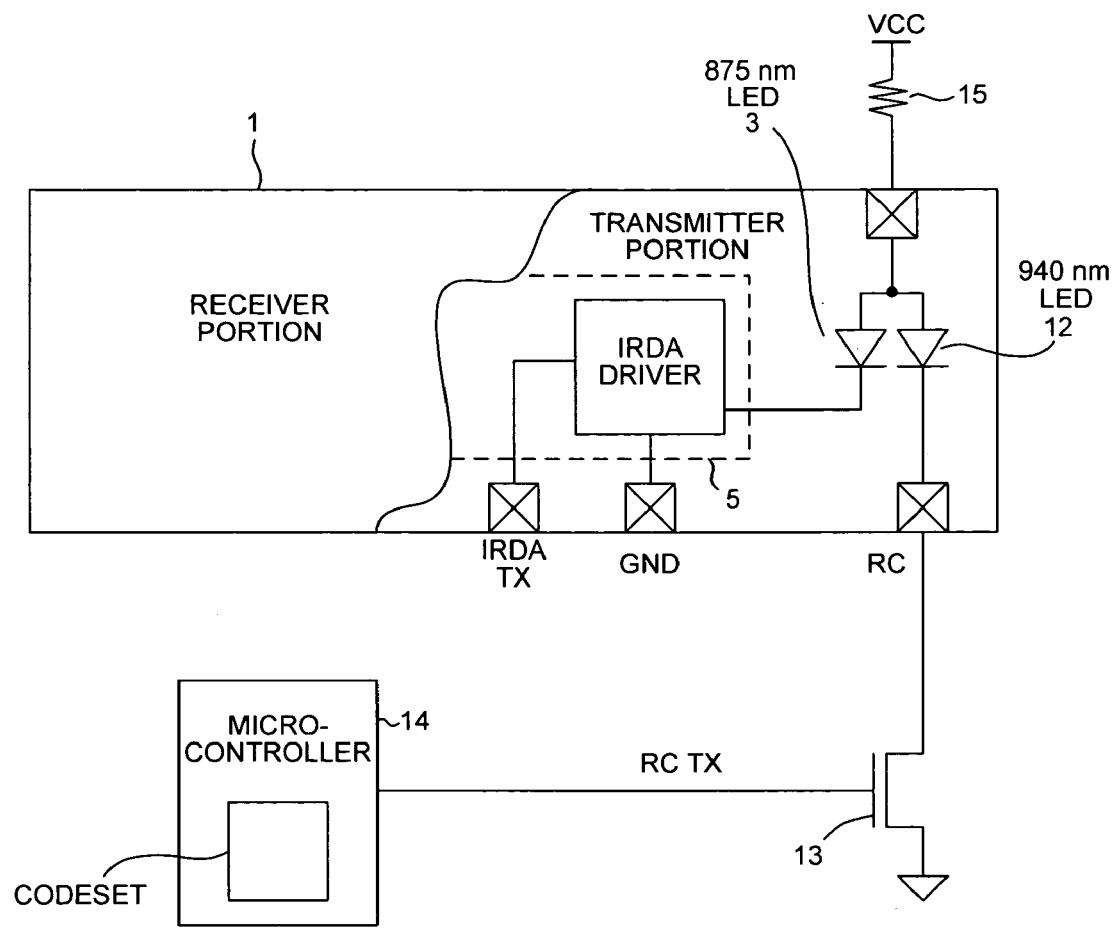
FIG. 4 (Prior Art) is a simplified schematic view of the IrDA module of FIG. 1.
Figure 5:
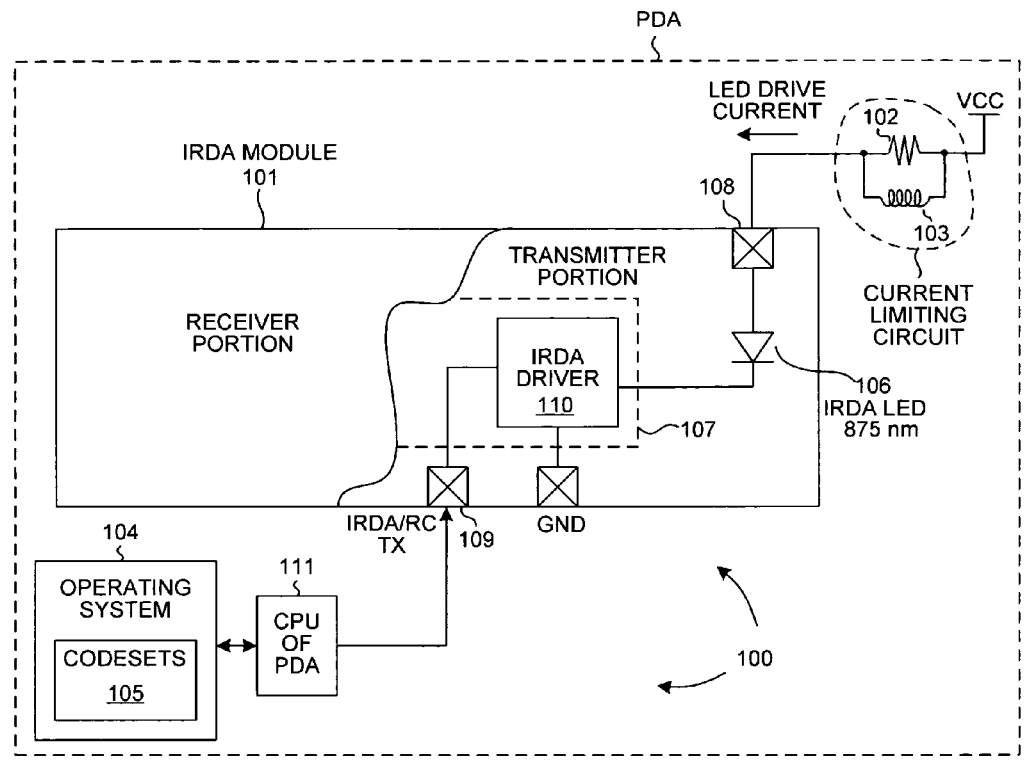
FIG. 5 is a simplified schematic view of a system involving an IrDA module in accordance with one embodiment of the present invention.

FIG. 5 is a diagram of a system 100 in accordance with one embodiment of the invention. System 100 includes an IrDA transceiver module 101, a current-limiting resistor 102, an inductor 103, a central processing unit (CPU) 111, and an operating system 104 that has access to IR remote control (RC) codeset information 105. Rather than providing two LED transmitter diode dice of different wavelengths in IrDA module 101, only one 875 nm transmitter LED diode die 106 is provided. IrDA module 101 includes the 875 nm transmitter LED diode die 106, a controller die 107, and an IrDA receiver PIN diode die (not shown). IrDa module 101 is of standard IrDA module construction and includes a molded plastic transmitter lens disposed over the IrDA transmitter diode 106 and another receiver lens disposed over the IrDA receiver diode. IrDA module 101 may be an IrDA module of conventional construction such as an IrDA module available from Zilog, Inc. of San Jose, Calif.

Inductor 103 and resistor 102 are disposed in parallel between a source of supply voltage VCC and an LED drive current supply terminal 108 of IrDA module 101. Inductor 103 and resistor 102 are both discrete components that are disposed on the printed circuit board upon which IrDA module 101 is mounted. In one example, this printed circuit board is the printed circuit board of a personal digital assistant (PDA).

When an IrDA transmission is to occur, the 875 nm transmitter LED diode 106 is controlled in the conventional IrDA manner. In one example, an IrDA signal is supplied to the IrDA module via an IrDA/RC TX terminal 109 on the IrDA module, and an IrDA driver portion 110 of controller die 107 pulls current through LED diode 106 in conventional fashion. The amount of LED drive current initially when current starts to flow through LED 106 is limited by current-limiting resistor 102. In one embodiment, the resistance of resistor 102 is approximately one ohm, the LED drive current is approximately 265 mA average (over the period of one IR burst of the IrDA transmission), and the resulting intensity of radiation emitted from IrDA module 101 is approximately 40 mW/sr at 875 nm.

When a remote control (RC) transmission is to occur, however, an RC control signal is generated by software executing on the CPU 111 of the PDA using the codeset information 105. No microcontroller that stores codeset information need be provided. Rather, codeset information 105 is stored in main memory on the PDA such that software executing on the CPU of the PDA can access the codeset information and use it to drive the IrDA/RC TX terminal 109 with the RC signal. This RC signal is provided to IrDA module 101 via the same IrDA/RC TX terminal 109 that is used to supply the IrDA signal for transmission. Although an RC signal is to be transmitted, transmitter diode 106 has a transmission peak at 875 nm. An IR remote control receiver (not shown) on an electronic consumer device (not shown) that is to be controlled by the RC transmission has a peak spectral sensitivity at a wavelength of approximately 940 nm. In accordance with the invention, it is recognized that most IR remote control receivers in electronic consumer devices will work satisfactorily if they receive 40 mW/steradian at 940 nm.

Figure 6:
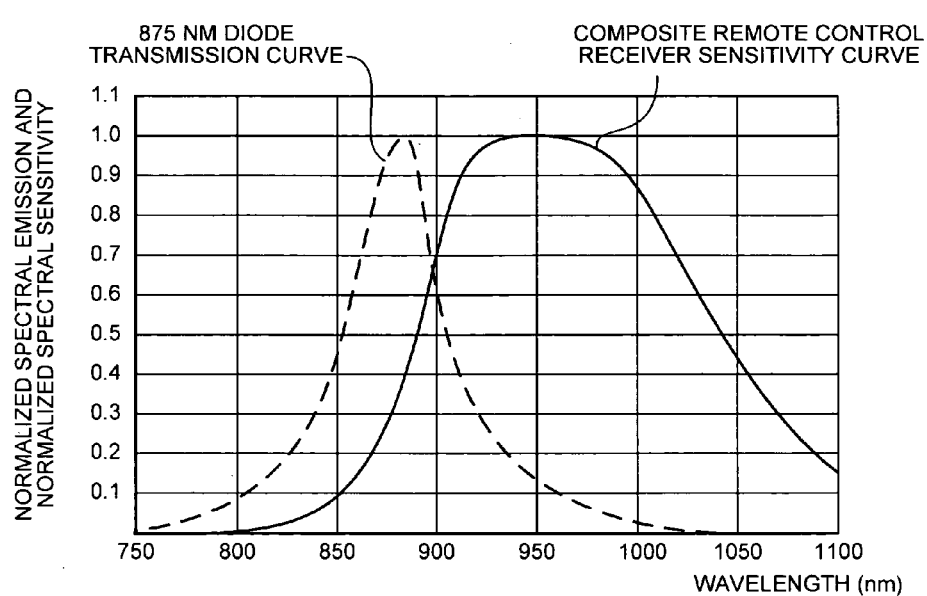
FIG. 6 is a chart that shows: 1) a normalized spectral emission curve of the 875 nm LED of the IrDA module of FIG. 5, and 2) a composite normalized spectral sensitivity curve for numerous remote control (RC) receivers.

FIG. 6 is a graph that shows the spectral emission distribution curve of 875 nm IrDA transmitting LED 106 as well as a composite spectral sensitivity curve for numerous typical IR remote control (RC) receivers. Note that the amount of radiation emitted from the 875 nm transmitting diode 106 drops from its normalized high at 875 as wavelength increases to the right of its peak. The amount of radiation emitted is down to sixty percent of its normalized high at 900 nm. Also note that the spectral sensitivity of the composite IR remote control (RC) receiver curve is at its normalized high at 940 nm, but that it is down to seventy percent of its high at 900 nm to the left of its peak.

In accordance with one embodiment of the present invention, the amount of drive current used to drive the 875 nm IrDA transmitting LED 106 is increased in RC mode in comparison to the IrDA mode. The LED drive current is increased in RC mode such the emissions at 940 nm from the IrDA module 101 are adequately strong to be received by an RC receiver at a distance of ten meters.

Figures 7, 8:
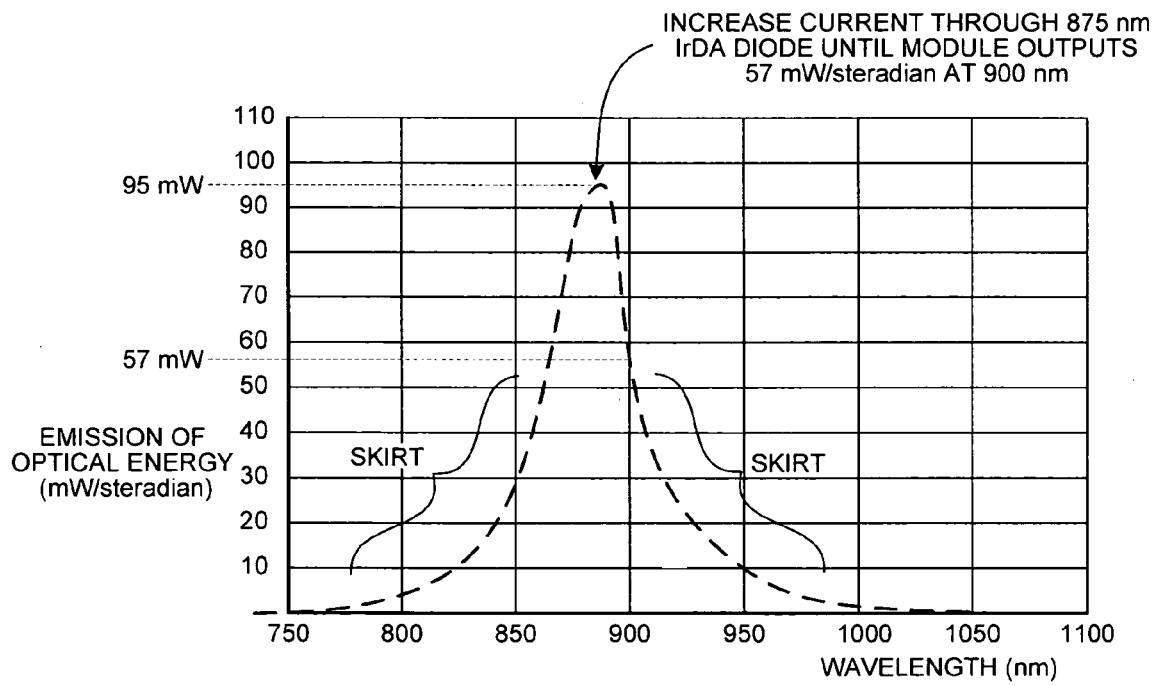
FIG. 7 is an equation that sets forth how to determine the peak power required to be emitted from the 875 nm LED in order for the IrDA module of FIG. 5 to work for RC applications at a distance of ten meters.
FIG. 8 is a chart showing how LED drive current should be increased until the 875 nm LED emits adequate radiation at 900 nm.

FIG. 7 sets forth the calculation of the peak radiated power to be output by the IrDA module 101 at 875 nm. The equation takes into account the fact that the composite RC receiver at 900 nm is only seventy percent as efficient as it is at its peak spectral efficiency of 940 nm. The equation takes into account the fact that the IrDA module 101 at 900 nm transmits only sixty percent of the radiated power that it does at 875 nm. The equation also takes the inverse square law into account and the fact that the IrDA transmitter is located ten meters away from the RC receiver. In accordance with the equation of FIG. 7, the IrDA module 101 is to emit 95 mW/sr of peak power at 875 nm when in RC mode.

FIG. 8 illustrates the emission distribution curve of IrDA module 101. As illustrated, IrDA module 101 outputs 57 mW/sr at 900 nm when it is outputting 95 wW/sr at 875 nm. At this power, the 875 nm IrDA transmitting LED 106 within IrDA module 101 transmits adequate power to communicate IR remote control (RC) communications to an electronic consumer device located ten meters away from the IrDA module.

The amount of LED drive current that results in IrDA module 101 emitting 95 mW/sr at 875 nm is determined. In one embodiment, this is done by building IrDA module 101, driving LED 106 with different drive currents, and measuring the emitted radiation at 875 nm. In this way, a relationship of LED drive current to emitted radiation at 875 nm is obtained. In other embodiments, optical design parameters affecting IrDA module emission efficiency are taken into account to determine the relationship between LED drive current and IrDA module emitted radiation at 875 nm. Such design parameters may, for example, include the distance the transmitting LED 106 is from its lens, the diameter of its lens, and the material of which its lens is made. In the present example, an LED drive current of 400 mA corresponds to approximately 95 mW/sr emitted from IrDA module 101 at 875 nm.

Whereas the amount of transmitted radiation is to be 95 mW/sr at 875 nm for RC applications, the amount of transmitted radiation should be less at 875 nm for IrDA applications. In the present example, an LED drive current of 265 mA corresponds to the amount of radiation to be emitted from IrDA module 101 when it is operating as an IrDA transmitter.

Figure 9:
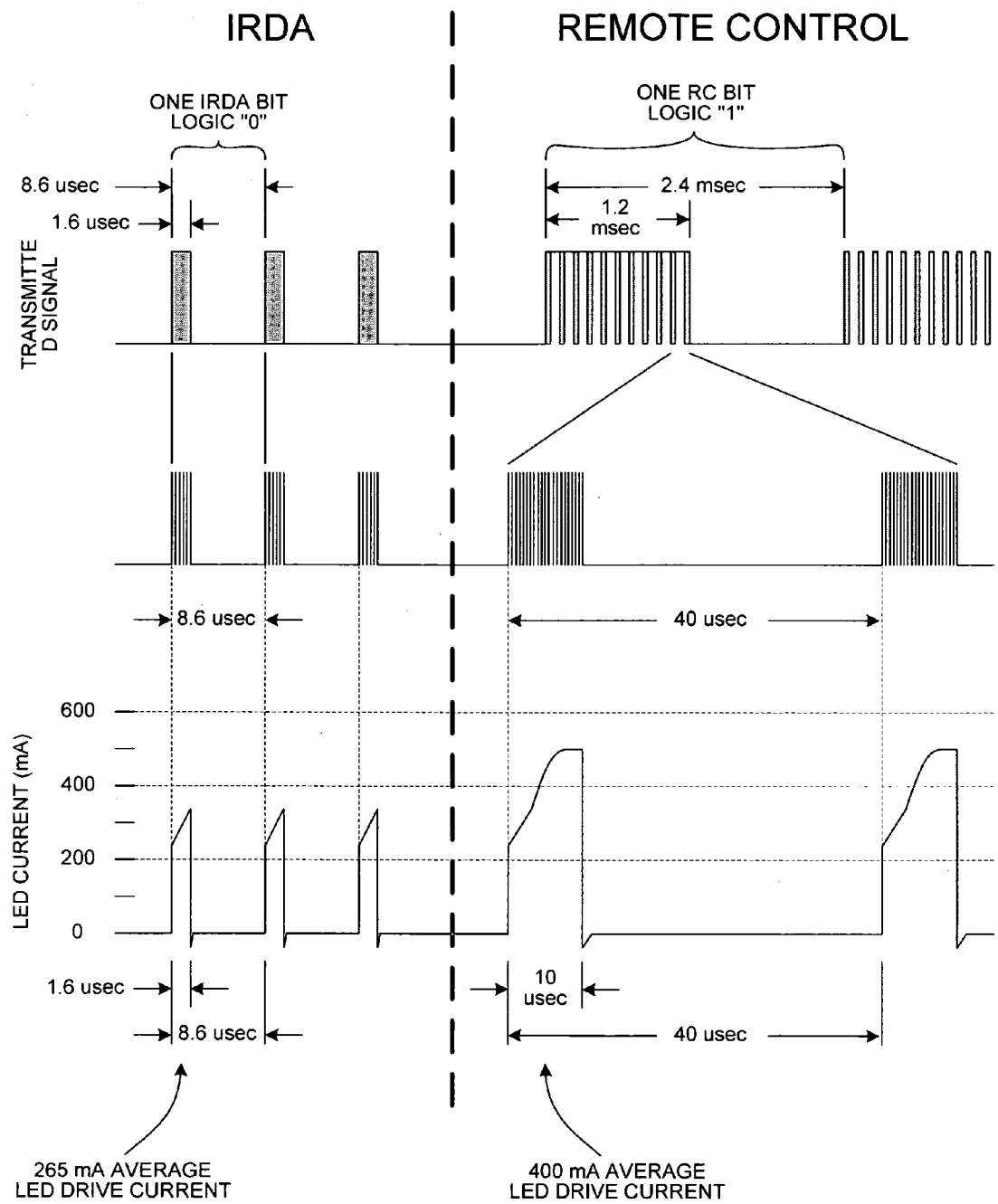
FIG. 9 is a diagram showing an IrDA transmission and an RC transmission, and how the average LED drive current is controlled by the passive current-limiting circuit in accordance with one embodiment of the present invention.

The circuit of FIG. 5 works to drive LED 106 with the lower amount of LED drive current (approximately 265 mA) when in IrDA mode and with the higher amount of LED drive current (approximately 400 mA) during RC mode by taking advantage of differences between the IrDA and RC protocols. FIG. 9 illustrates some of these protocol differences. The left half of FIG. 9 illustrates a typical IrDA transmission. The IrDA transmission is not modulated with a sub-carrier. The right half of FIG. 9 illustrates a typical RC transmission. Note that the mark times of the RC signal are modulated with a sub-carrier. The second row of waveforms shows this modulation of the RC signal in greater detail. Individual bursts of IR are approximately 1.6 microseconds long in the IrDA example on the left, whereas individual bursts of IR are approximately 10 microseconds long in the RC example on the right.

Inductor 103 (see FIG. 5) operates to shunt current flow around current-limiting resistor 102, but the current flow through inductor 103 increases with time in accordance with the inductor equation $V=Ldi/dt$. Accordingly, in the case of the shorter 1.6 microsecond IR burst duration of the IrDA signal, the LED drive current is as illustrated in the lower left of FIG. 9. LED drive current increases over time from its starting value (determined at least in part by resistor 102), but the duration of the IR burst is short and there is not very much current increase. As illustrated in FIG. 9, the average LED current is about 265 mA.

In the case of the longer 10 microsecond IR burst of the RC signal, however, the LED drive current increases for a longer period of time. Inductor 103 shunts current around current-limiting resistor 102. In one embodiment, the inductor is made to saturate such that the combined parallel impedance of resistor 102 and inductor 103 limits peak current flow to approximately 500 mA. Accordingly, the LED current waveform in the lower right of FIG. 9 shows the current increasing over time during the beginning part of the IR burst period, and then leveling off at the saturated 500 mA level. The average LED drive current is approximately 400 mA over the IR burst period.

It is therefore seen that the 875 nm IrDA transmitter LED 106 is driven with a lower 265 mA average drive current during an IR burst of an IrDA transmission, but is driven with a higher 400 mA average drive current during an IR burst of an RC transmission. The 400 mA average drive current results in the IrDA module 101 outputting the desired 95 mW/sr peak power at 875 nm when IrDA transmissions are made.

In the present example, inductor 103 has an inductance of approximately 30 microhenrys and has a DC series resistance of approximately 1.5 ohms. It is approximately 0.18 inches in diameter. It has a powdered iron toroidal core and is mounted on a 0802 component size coil platform. The platform allows inductor 103 to be placed on the PDA printed circuit board using automatic component placement equipment.

In another embodiment, the inductance of inductor 103 is provided in the form of a printed circuit board trace and associated magnetic core material on the printed circuit board of the IrDA module. Known techniques for integrating and miniaturizing an inductor are applicable to further reduce size and cost. Rather than a single inductor component 103 being disposed in parallel with resistor 102, a second resistor component may be placed in series with inductor 103 such that current shunted around resistor 102 passes through both the inductor and the second resistor.

The system of FIG. 5 has considerable advantages in comparison to the system employed by the PDA manufacturer as set forth above in the background information section of this patent document. The size of the controller chip within the IrDA module does not need to be increased. The relatively expensive external FET of the circuit set forth in the background information section can be dispensed with and replaced with a relatively inexpensive inductor (a passive component). The overall solution of FIG. 5 is far less expensive than the circuit set forth in the background information section that requires a microcontroller. It consumes less power. Assembly of the IrDA module is not complicated by having to place two LED dice in close proximity to one another under a small lens. IrDA module cost does not involve the cost of having to provide a second LED die. The extra terminal on the IrDA module required to couple to the external FET in the circuit set forth in the background information section is also not required. A standard IrDA module can be used. The amount of LED drive current is controlled using only passive components (i.e., a resistor and an inductor).

Although the present invention is described in connection with certain specific embodiments for instructional purposes, the present invention is not limited thereto. Although an LR filter involving current-limiting resistor 103 and inductor 102 is described above, other circuits can be used to change the amount of LED drive current to accommodate dual IrDA and RC use of LED 106. The IRDA driver 110 may, for example, include an internal drive current control circuit that controls LED 106 to be driven with more drive current when in an RC mode and controls LED 106 to be driven with a lesser amount of drive current when in an IrDA mode. Controller die 107 may include a terminal for receiving a control signal indicative of whether an IrDA transmission is to occur, or whether an RC transmission is to occur. A circuit with a first resistance when in an IrDA mode and a second resistance when in an RC mode can be disposed in the LED drive current path, where the resistance of the circuit is determined by a control signal received onto a control input lead of the circuit. The circuit may, for example, include a first resistor and a second resistor connected in series, where a transistor is disposed in parallel with the second resistor. In an RC mode, the transistor is controlled to be non-conductive such that the resistance of the circuit is the combined resistance of the two resistors. In an IrDA mode, the transistor is controlled to be conductive such that the transistor shorts out the second resistor and such that the resistance of the circuit is the resistance of the first resistor. Such a variable resistance circuit can be disposed on a PDA printed circuit board or can be included on an IrDA module. Such a circuit can be integrated into controller die 110. Although an embodiment of an IrDA module is set forth above that only has one 875 nm LED die, it is to be understood that more than one 875 nm LED dice can be disposed in parallel under the same transmitter lens. Only one of the two LEDs is used in the IrDA mode, whereas both LEDs are used in the RC mode. The two 875 nm LEDs can be disposed on a single die rather than being disposed on two different dice. Accordingly, various modifications, adaptations, and combinations of various features of the described embodiments can be practiced without departing from the scope of the invention as set forth in the claims.

What is claimed is:

1. A method, comprising:
providing an inductor in a current path through which an LED drive current is provided to an infrared light emitting diode (LED) of an IrDA transceiver module, wherein the LED drive current is no more than 265 mA when the IrDA transceiver module is transmitting an IrDA transmission, and wherein the LED drive current is no more than 400 mA when the IrDA transceiver module is transmitting an RC transmission.

2. A circuit, comprising:
a transceiver module having a single light emitting diode (LED), wherein the transceiver module generates a first type of signal having an intensity of radiation emitted from the LED that is at least 40 mW/steradian at a wavelength of less than 900 nm, and wherein the transceiver module generates a second type of signal having an intensity of radiation emitted from the LED that is at least 40 mW/steradian at a wavelength of greater than 900 nm; and
a passive current-limiting circuit that limits an LED drive current flowing through the LED to a first average current value when the LED is generating the first type of signal, and that limits the LED drive current to a second average current value when the LED is generating the second type of signal.

3. The circuit of claim 2, wherein the LED drive current is no more than 265 mA when the transceiver module is generating the first type of signal, and wherein the LED drive current is no more than 400 mA when the transceiver module is generating the second type of signal.

4. The circuit of claim 2, wherein the LED emits infrared light having a peak emission at a wavelength below 900 nm.

5. The circuit of claim 2, wherein the transceiver module generates the first type of signal with an intensity of radiation that is at least 40 mW/steradian at 875 nm.

6. The circuit of claim 2, wherein the transceiver module generates the second type of signal with an intensity of radiation that is at least 40 mW/steradian at 940 nm.

7. The circuit of claim 2, wherein the passive current-limiting circuit includes an inductor.

8. The circuit of claim 7, wherein the inductor is an inductance of a trace on a printed circuit board.

9. The circuit of claim 2, wherein the IrDA transceiver module has a terminal through which it receives the LED drive current, and wherein the passive current-limiting circuit includes a resistor and an inductor, the resistor having a first terminal and a second terminal, the inductor having a first terminal and a second terminal, wherein the first terminal of the resistor and the first terminal of the inductor are coupled to the terminal of the IrDA transceiver module, and wherein the second terminal of the resistor is coupled to the second terminal of the inductor.

10. The circuit of claim 2, further comprising:
a central processing unit (CPU) that executes an operating system program, the CPU being able to generate an IrDA signal that is supplied to an IrDA module, wherein the IrDA module converts the IrDA signal into the first type of signal using the LED, and wherein the CPU is able to read codeset information and to generate an RC signal that is supplied to the IrDA module, wherein the IrDA module converts the RC signal into the second type of signal using the LED.

11. The circuit of claim 2, wherein the passive current-limiting circuit includes no active circuit components.

12. The circuit of claim 2, wherein the passive current-limiting circuit includes a resistor, and wherein the first type of signal includes a bit portion, the bit portion including an IR burst having a time duration of approximately 1.6 microseconds, the first average current value being determined in part by the time duration and in part by a resistance of the resistor.

13. The circuit of claim 2, wherein the passive current-limiting circuit includes an inductor that saturates such that a current flow through the passive current-limiting circuit to the transceiver module has a maximum value, and wherein the current flow through the passive current-limiting circuit does not reach the maximum value when the first type of signal is generated, and wherein the current flow through the passive current-limiting circuit does reach the maximum value when the second type of signal is generated.

14. A system, comprising:
- a transceiver module usable for transmitting both a first type of signal and a second type of signal, wherein the first type of signal has an intensity of radiation that is at least 40 mW/steradian at a wavelength of less than 900 nm, and wherein the second type of signal has an intensity of radiation that is at least 40 mW/steradian at a wavelength of greater than 900 nm;
- a passive current-limiting circuit, wherein the transceiver module receives an LED drive current from the passive current-limiting circuit; and
- a processor that supplies a signal with a first modulation to the transceiver module such that the transceiver module generates the first type of signal with a first average infrared emission intensity, the processor also supplying a signal with a second modulation to the transceiver module such that the transceiver module generates the second type of signal with a second average infrared emission intensity, the second average infrared emission intensity being substantially greater than the first average infrared emission intensity, and wherein both the first type of signal and the second type of signal are generated using a single infrared light emitting diode (LED) disposed on the transceiver module.

15. The system of claim 14, wherein the processor accesses codeset information and uses the codeset information to generate the second type of signal.

16. The system of claim 14, wherein the LED drive current has a first maximum value when the transceiver module generates the first type of signal, wherein the LED drive current has a second maximum value when the transceiver module generates the second type of signal, and wherein the second maximum value is substantially larger than the first maximum value.

17. The system of claim 14, wherein the passive current-limiting circuit comprises an inductor.

18. The system of claim 14, wherein the first type of signal includes a plurality of first infrared bursts, the first average infrared emission intensity being an intensity of each of the first infrared bursts, and wherein the second type of signal includes a plurality of second infrared bursts, the second average infrared emission intensity being an intensity of each of the second infrared bursts.

* * * * *